United States Patent
Hidaka et al.

(10) Patent No.: US 7,735,857 B2
(45) Date of Patent: Jun. 15, 2010

(54) CURTAIN-TYPE AIRBAG APPARATUS AND AIRBAG MODULE

(75) Inventors: Nobuyuki Hidaka, Saitama (JP); Kouzaburou Nakai, Shioya-gun (JP); Tadashi Inazu, Utsunomiya (JP); Takeru Fukuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 11/807,419

(22) Filed: May 29, 2007

(65) Prior Publication Data

US 2007/0296185 A1    Dec. 27, 2007

(30) Foreign Application Priority Data

| Jun. 23, 2006 | (JP) | ............................ 2006-174013 |
| Nov. 21, 2006 | (JP) | ............................ 2006-314103 |

(51) Int. Cl.
  *B60R 21/213*  (2006.01)
(52) U.S. Cl. ............................... 280/730.2; 280/728.2
(58) Field of Classification Search ............. 280/728.2, 280/730.2
See application file for complete search history.

(56) References Cited

U.S. PATENT DOCUMENTS

| 6,149,185 | A  | * | 11/2000 | White et al. | ............. 280/728.2 |
| 6,173,990 | B1 | * | 1/2001  | Nakajima et al. | ......... 280/730.2 |
| 6,302,434 | B2 | * | 10/2001 | Nakajima et al. | ......... 280/730.2 |
| 6,312,008 | B1 | * | 11/2001 | Neag | ..................... 280/728.2 |
| 6,334,626 | B2 | * | 1/2002  | Nakajima et al. | ......... 280/730.2 |
| 6,340,169 | B1 | * | 1/2002  | Tietze | .................... 280/728.2 |
| 6,485,048 | B2 | * | 11/2002 | Tajima et al. | ............ 280/728.2 |
| 6,540,287 | B2 | * | 4/2003  | Luik et al. | .................. 296/214 |
| 6,565,117 | B2 | * | 5/2003  | Kubota et al. | ............ 280/730.2 |
| 6,616,175 | B2 | * | 9/2003  | Hofmann et al. | .......... 280/728.3 |
| 6,616,222 | B1 | * | 9/2003  | Ponceau | ...................... 296/214 |
| 6,626,457 | B2 | * | 9/2003  | Masuda et al. | ............ 280/728.2 |
| 6,736,421 | B2 | * | 5/2004  | Blake et al. | ............... 280/730.2 |
| 6,761,374 | B2 | * | 7/2004  | Di Sante et al. | ........... 280/728.2 |
| 6,793,241 | B2 | * | 9/2004  | Wallner et al. | ............ 280/730.2 |
| 6,802,527 | B2 | * | 10/2004 | Schmidt et al. | ........... 280/728.2 |
| 6,851,702 | B2 | * | 2/2005  | Henderson et al. | ........ 280/728.2 |
| 6,923,471 | B2 |   | 8/2005  | Salzle |  |
| 6,974,151 | B2 | * | 12/2005 | Ochiai et al. | .............. 280/728.2 |
| 7,011,337 | B2 | * | 3/2006  | Aoki et al. | ................ 280/730.2 |
| 7,025,377 | B2 | * | 4/2006  | Ryu | ......................... 280/730.2 |
| 7,040,647 | B2 | * | 5/2006  | Deligny et al. | ............ 280/728.2 |
| 7,097,200 | B2 | * | 8/2006  | Wold | ........................ 280/730.2 |

(Continued)

FOREIGN PATENT DOCUMENTS

DE    201 18 457 U 1    5/2002

(Continued)

*Primary Examiner*—Paul N Dickson
*Assistant Examiner*—Nicole Verley
(74) *Attorney, Agent, or Firm*—Carrier, Blackman & Associates, P.C.; William D. Blackman; Joseph P. Carrier

(57) ABSTRACT

This curtain-type airbag apparatus is provided with: an airbag which is arranged along a top edge of a vehicle body and develops in a curtain-shape manner along an inside of a window; and an inner cover which covers a vehicle interior side of the airbag. The inner cover is supported by the vehicle body via a hinge member having a reversed U-shape.

13 Claims, 13 Drawing Sheets

U.S. PATENT DOCUMENTS

| | | | |
|---|---|---|---|
| 7,100,939 B2 * | 9/2006 | Blake et al. | 280/728.2 |
| 7,159,896 B2 * | 1/2007 | Ochiai et al. | 280/730.2 |
| 7,175,196 B2 * | 2/2007 | Boxey | 280/730.2 |
| 7,182,366 B2 * | 2/2007 | Enriquez | 280/730.2 |
| 7,213,835 B2 * | 5/2007 | Totsuka et al. | 280/730.2 |
| 7,322,601 B2 * | 1/2008 | Bertossi | 280/730.2 |
| 7,325,824 B2 * | 2/2008 | Totani et al. | 280/728.2 |
| 7,547,038 B2 * | 6/2009 | Coleman | 280/728.2 |
| 2002/0190507 A1 | 12/2002 | Sante et al. | |
| 2003/0090092 A1 | 5/2003 | Salzle | |
| 2003/0205887 A1 | 11/2003 | Wallner et al. | |
| 2004/0000775 A1 * | 1/2004 | Henderson et al. | 280/730.2 |
| 2004/0061316 A1 | 4/2004 | Elqadah et al. | |
| 2004/0256843 A1 * | 12/2004 | Totani et al. | 280/730.2 |
| 2005/0029778 A1 * | 2/2005 | Weber et al. | 280/728.2 |
| 2005/0046154 A1 * | 3/2005 | Rhea et al. | 280/728.2 |
| 2006/0138750 A1 * | 6/2006 | Park | 280/728.2 |
| 2006/0267315 A1 * | 11/2006 | White, Jr. | 280/728.2 |
| 2007/0045999 A1 * | 3/2007 | Saberan et al. | 280/730.2 |
| 2007/0052220 A1 * | 3/2007 | Hidaka | 280/730.2 |
| 2007/0132217 A1 * | 6/2007 | Seong | 280/730.2 |
| 2007/0222192 A1 * | 9/2007 | Yamagiwa et al. | 280/730.2 |
| 2009/0127834 A1 * | 5/2009 | Hemingway | 280/728.2 |

FOREIGN PATENT DOCUMENTS

| | | |
|---|---|---|
| EP | 1 256 492 A2 | 11/2002 |
| EP | 1 359 061 A2 | 11/2003 |
| JP | 2004-291859 | 10/2004 |
| WO | WO 2006/062738 A1 | 6/2006 |

* cited by examiner

CURTAIN-TYPE AIRBAG APPARATUS AND AIRBAG MODULE

BACKGROUND OF THE INVENTION

Priority is claimed on Japanese Patent Application No. 2006-174013, filed Jun. 23, 2006, and Japanese Patent Application No. 2006-314103, filed Nov. 21, 2006, the contents of which are incorporated herein by reference.

1. Field of the Invention

The present invention relates to a curtain-type airbag apparatus and an airbag module which develop an airbag in a curtain-shape manner along an inside of a window of a vehicle.

2. Description of the Related Art

A curtain-type airbag apparatus which develops an airbag in a curtain-shape manner along an inside of a window of a vehicle, is provided with an airbag which is arranged along a roof side rail being a top edge of a window and has a vehicle interior side covered with an inner cover, while in an accommodated state thereof. The developing airbag develops while pressing the inner cover to open it. A conventional art is proposed in which: a deformable thinner portion is formed in the inner cover itself in order to enable easy opening thereof; and a portion lower that the thinner portion is rotated by pressing force of the airbag (for example, refer to Japanese Unexamined Patent Application, First Publication No. 2004-291859 (hereinafter "Patent Document 1")).

In the case in which a round-shaped design is employed for the roof side rail being the top edge provided with the airbag, the inner cover and the thinner portion formed therein have to employ the round-shaped design also; however, such design is not suitable for an opening operation of the inner cover (i.e., not suitable for enabling a smooth rotation of the portion lower than the thinner portion). That is, the linear-shaped thinner portion enables easy rotation of the lower portion, while the round-shaped thinner portion makes the easy rotation harder. Accordingly, in order to prevent this problem, a slidable inner cover may be employed; however, such construction needs a comparatively large device for sliding the inner cover, and also disables obtaining a large opening through which the airbag develops. In addition, the above-mentioned Patent Document 1 discloses a construction in which: the vehicle interior side and the vehicle exterior side of the airbag are covered with covers to form a module; and the module is installed in a vehicle body by clips provided on the vehicle exterior side of the cover. However, such installation structure disables securing sufficient rigidity for maintaining the shape of the module.

Accordingly, the present invention has an object of providing: a curtain-type airbag apparatus which enables a smooth opening of an inner cover by a developing airbag with a wide opening, even in the case in which the airbag is arranged along a top edge of a round-shaped window; and an airbag module which enables increasing the high rigidity for maintaining the shape thereof.

SUMMARY OF THE INVENTION

The present invention employed the followings to achieve the above object.

That is, the present invention employed a curtain-type airbag apparatus including: an airbag which is arranged along a top edge of a vehicle body and develops in a curtain-shape manner along an inside of a window; and an inner cover which covers a vehicle interior side of the airbag, wherein the inner cover is supported by the vehicle body via a hinge member having a reversed U-shape.

According to the curtain-type airbag apparatus, when the airbag develops to apply a pressing force to the inner cover, the hinge member having the reversed U-shape and attaching the inner cover to the vehicle body will deform to rotate the inner cover. Since the hinge member is attached in addition to the inner cover, and is deformed to rotate the inner cover, the arrangement flexibility of the hinge member can be comparatively high. Accordingly, even in the case in which the airbag is disposed along the top edge of the window having a round shape, the developing airbag can smoothly press and open the inner cover. Furthermore, a large opening for rotating the inner cover can be secured.

The hinge member may be a metal member.

In this case, since the hinge member is a metal member, influences by temperature will hardly occurs comparing to employing a resin member; therefore, a stable opening can be obtained.

The hinge member may be partially provided along a length direction of the airbag.

In this case, since the hinge members are partially provided along a length direction of the airbag, even in the case in which the airbag is disposed along the top edge of the window having a round shape, the inner cover can be pressed and opened by the airbag which develops more easily.

The inner cover may be attached to the vehicle body together with another interior member via a common bracket.

In this case, since the inner cover is attached to the vehicle body together with another interior member via the common bracket, it is possible to reduce the number of parts and the number of assembling procedures. Furthermore, since another interior member and the bracket can be assembled in advance to form a module, the installation thereafter can be made easily.

The present invention also employed an airbag module for installing an airbag in a folded manner to a vehicle body, the airbag developing in a curtain-shape manner along an inside of a window of a vehicle body, the airbag module including: a bracket which attaches the airbag to the vehicle body; an inner cover which is attached to the bracket and covers a vehicle interior side of the airbag; and an outer cover which is attached to the bracket and covers a vehicle exterior side of the airbag.

According to the airbag module, the rigidity for maintaining the shape of the airbag module can be increased by uniting the inner cover which covers the vehicle interior side of the airbag via the bracket for attaching the airbag, and the outer cover which covers the vehicle exterior side of the airbag. In addition, the airbag module can conform to the cabin interior color by replacing the inner cover only. Furthermore, in this case, the outer cover and the airbag can be used commonly.

The airbag module may further include a hinge member provided between the bracket and the inner cover.

In this case, since the hinge member is provided between the bracket and the inner cover, while developing the airbag, the inner cover can swing in relation to the bracket by the hinge member, and therefore a large force will not be applied to the inner cover. Accordingly, it is possible to further stabilize the motion during the development of the airbag.

The airbag module may further include an attaching portion which is connected between the bracket and the inner cover without the hinge member.

In this case, since the attaching portion which is connected between the bracket and the inner cover without the hinge member is provided, the hinge member will not be loosen at the ordinal state.

The hinge member may be a U-shaped member in which one end thereof is attached to the inner cover, while another end thereof is attached to the bracket.

In this case, since the hinge member is the U-shaped member in which one end thereof is attached to the inner cover while another end thereof is attached to the bracket, the characteristics of the hinge member can be adjusted by the U-shaped member; therefore, the characteristics of the inner cover while developing the airbag can be changed easily.

The hinge member may be a cloth member which is unitarily formed with the inner cover.

In this case, since the hinge member is the cloth member which is unitarily formed with the inner cover (for example, a skin formed by extending a portion of the inner cover, or a back skin which is provided to the backside of a resin of the inner cover in addition to the skin), it is possible to extremely reduce the resistance of the inner cover while developing the airbag.

The airbag module may form a module together with another interior member to be attached to the bracket.

In this case, by attaching in advance another interior member to the bracket, to form a module, it is possible to cancel a process of attaching only another interior member. Accordingly, the assembly can be made easily.

Another interior member may be a grab handle.

In this case, since: another interior member is the grab handle which needs to be attached to the vehicle body comparatively firmly; and the grab handle can form a module by attaching it to the bracket in advance, it is possible to confirm the assembling status of the grab handle in advance to attaching it to the vehicle body. Accordingly, it is possible to suppress generation of an installation failure or the like.

The present invention also employs a curtain-type airbag apparatus including: the above-mentioned airbag module; and a covering member which covers the bracket in a state in which the airbag module is attached to the vehicle body.

According to the curtain-type airbag apparatus, since the covering member covers the bracket of the airbag module while the airbag module is attached to the vehicle body, it is possible form a continuous design line of the inner cover by covering the bracket after fixing the bracket to the vehicle body by fixing members such as bolts.

The covering member may be formed by an extension of a roof lining.

In this case, since the bracket is covered with the roof lining, it is possible to conform the design line of the roof lining to the design line of the inner cover, and thereby arranging them continuously. In addition, since another covering member is unnecessary, the covering member can be attached easily.

The curtain-type airbag apparatus may further include an exposed portion which is provided to a portion of the outer cover, and is exposed from the covering member while in a state in which the airbag module and the covering member are attached to the vehicle body.

In this case, since the exposed portion which is provided to the portion of the outer cover and is exposed from the covering member, it is possible to obtain a design accent. In addition, since there is not an upper side cover, the resistant force while developing the airbag can be reduced. In addition, since a rotational axis during the development is located at the upper position, the inner cover can be opened easily. Accordingly, it is possible to obtain a stable opening.

Another interior member may be attached to the exposed portion of the outer cover.

In this case, by attaching the interior member to the exposed portion of the outer cover, the around of another interior member can be arranged by a design line of the outer cover, the design flexibility can be increased. Furthermore, since another interior member can be assembled later to the module, the assembling flexibility can be increased.

DETAILED DESCRIPTION OF THE INVENTION

First Embodiment

A curtain-type airbag apparatus according to a first embodiment of the present invention will be explained below with reference to FIGS. 1 to 5. Moreover, the following explanations will be made using the directions of the curtain-type airbag apparatus installed in a vehicle.

Figure 1:
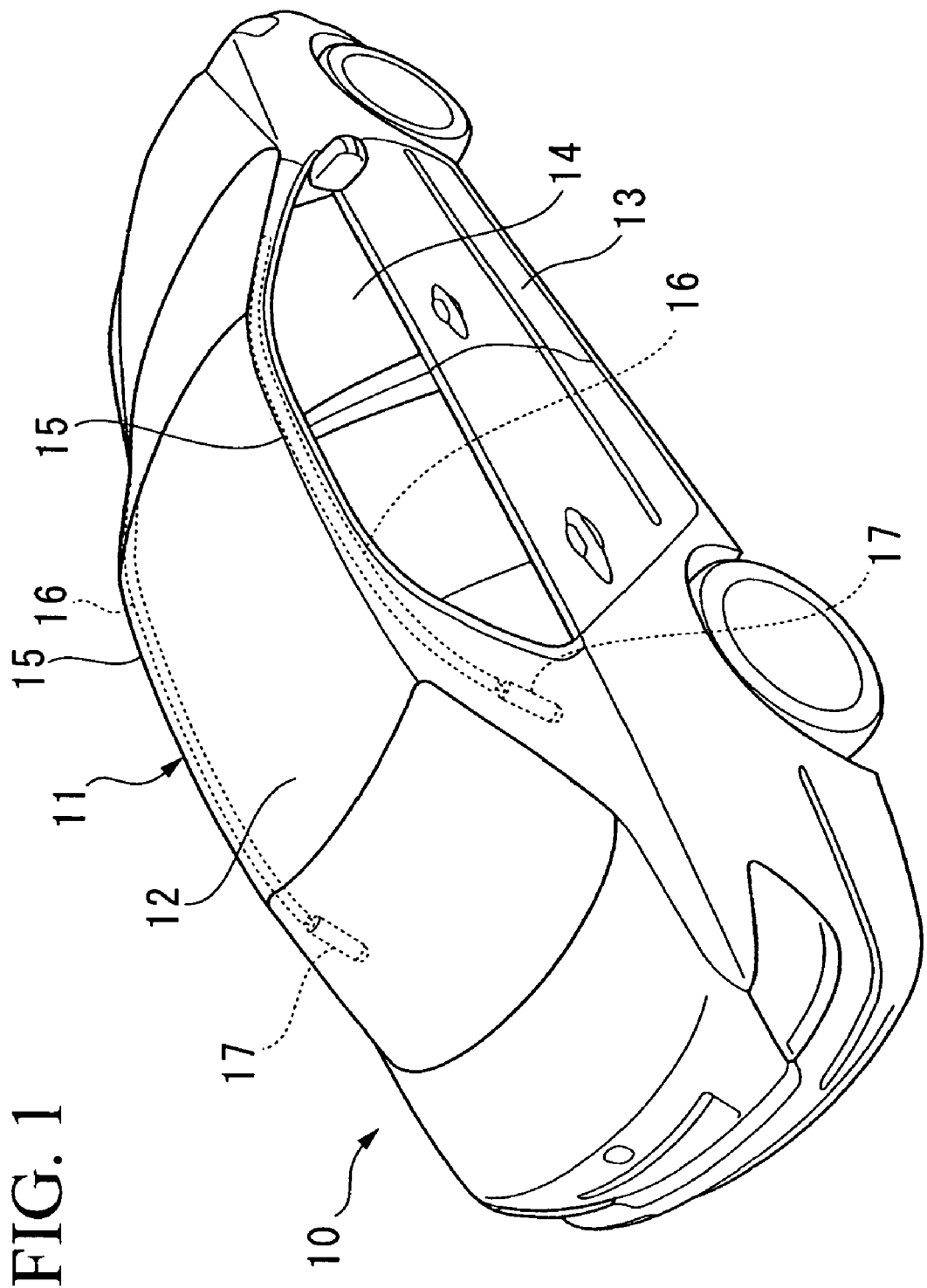
FIG. 1 shows a perspective view of a vehicle provided with a curtain-type airbag apparatus according to a first embodiment of the present invention.

FIG. 1 shows a perspective view of a vehicle 10 seen from a right rear side thereof. A pair of left and right roof side rails 15 forming top ends of windows 14 on a portion of the vehicle roof 12 above the side doors 13 are provided on the vehicle 10 at both sides of the roof 12 of a vehicle body 11, so as to extend along the vehicle length direction. A long airbag 16 which develops downward in a curtain-shape manner along the inside of the window 14 is arranged along the vehicle length direction at each of the vehicle interior sides of the roof side rails 15.

Each of the roof side rails 15 of the vehicle 10 has a slightly rounded shape in which a middle portion thereof protrudes upward; and in accordance with the shapes of these roof side rails 15, the airbags 16 also have the same rounded shape. An inflator 17 for generating gas to inflate the airbag 16 is provided at each rear side of the airbags 16 in the vehicle length direction.

Figure 2:
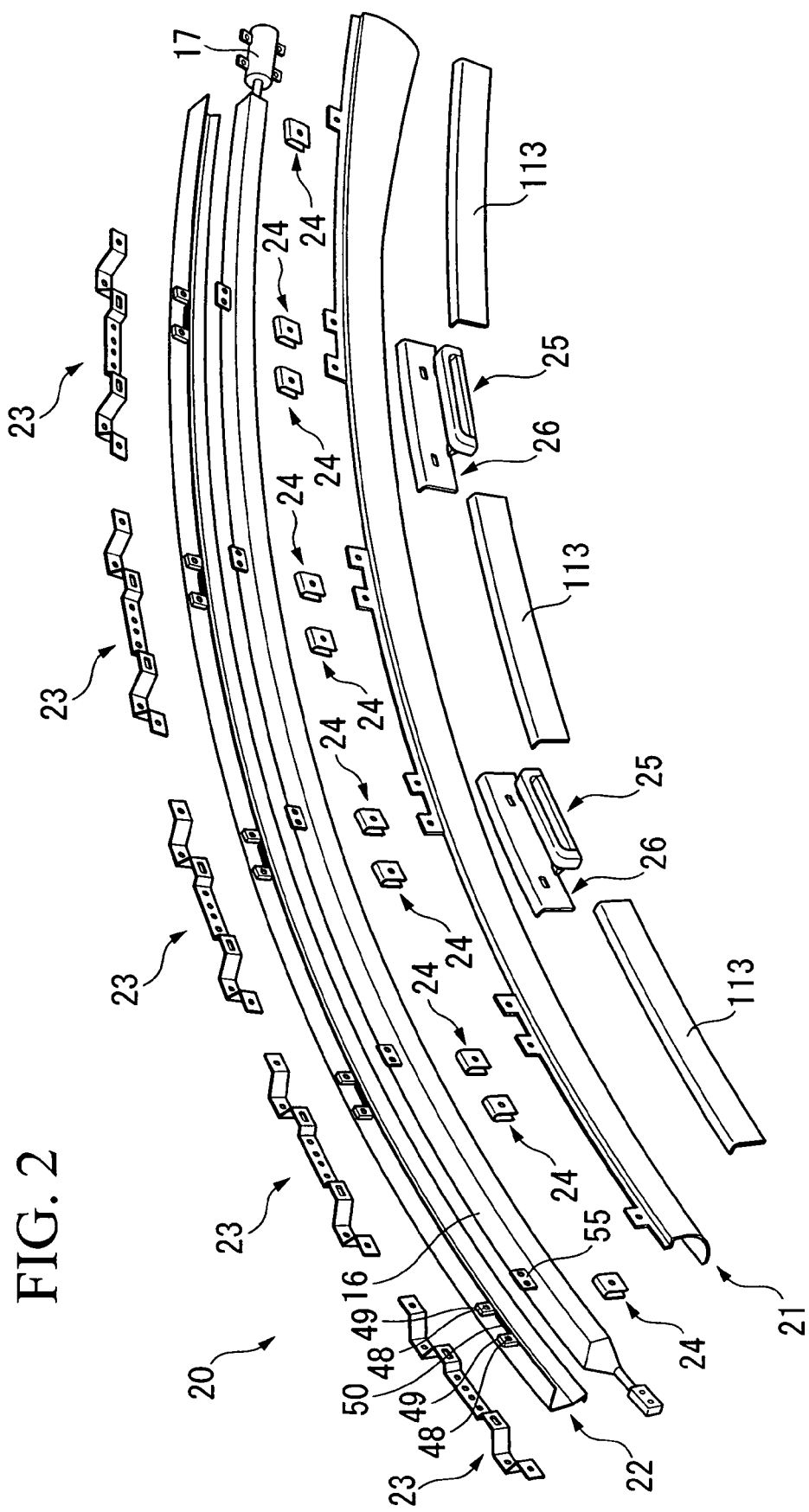
FIG. 2 shows an exploded perspective view of the curtain-type airbag apparatus.

As shown in FIG. 2, a curtain-type airbag apparatus 20 of the present embodiment is provided with: the airbag 16 having the totally rounded shape as explained in the above; the inflator 17; a resin-made inner cover 21 having a length extending along the vehicle length and having the same kind of rounded shape, and arranged at the vehicle interior side of the airbag 16; a resin-made outer cover 22 having a length extending along the vehicle length and the same kind of rounded shape, and arranged at the vehicle exterior side of the airbag 16; a plurality of spaced-apart metal brackets 23 which are attached to the vehicle exterior side of the airbag 16 and also to the outer cover 22; a plurality of metal hinge members 24 for attaching the inner cover 21 to the brackets 23; a plurality of grab handles (grab rails, another interior member) 25 substantially made of resin; and a plurality of resin-made cover bases 26 which are bases for attaching the grab handles 25.

Figure 3:
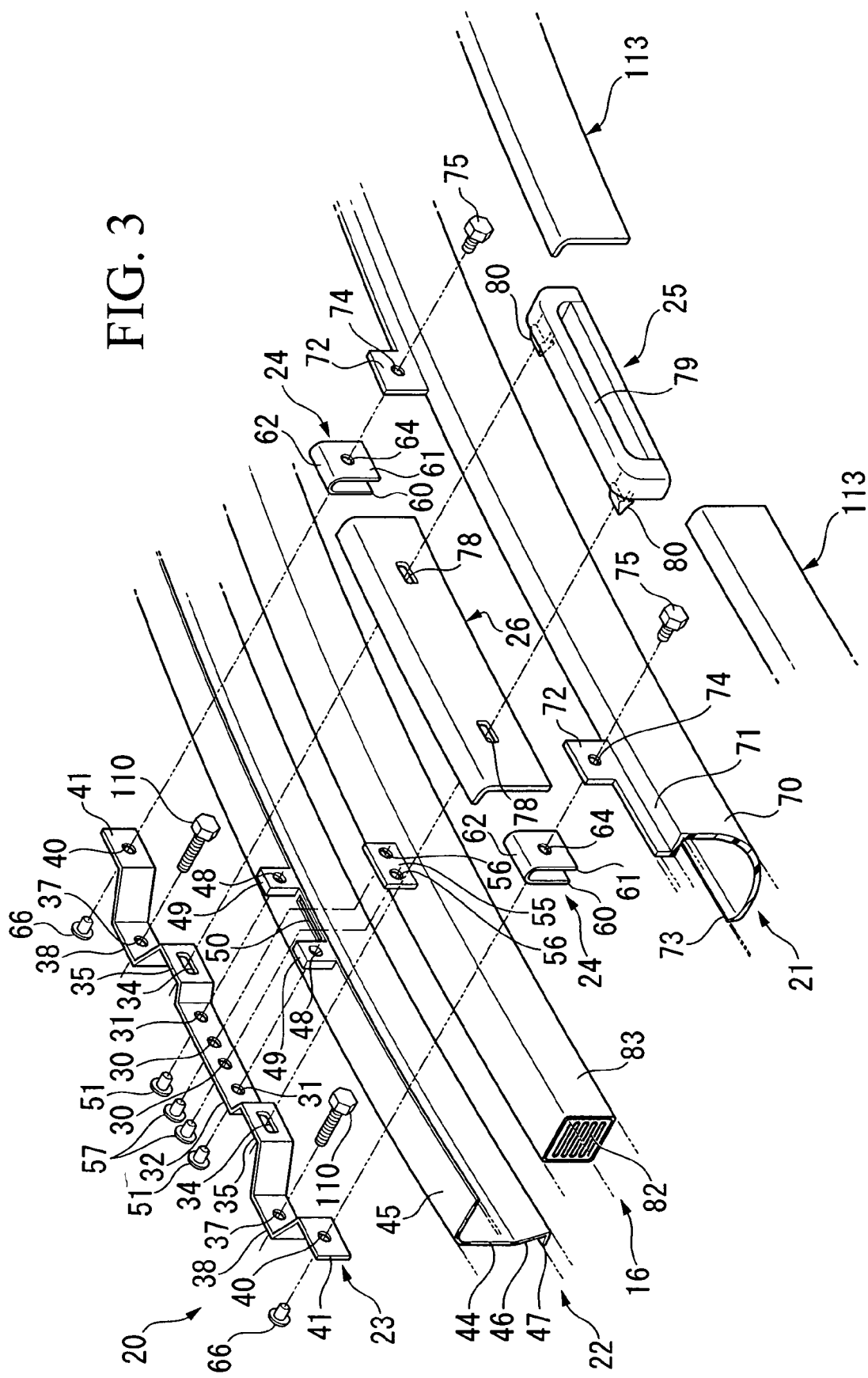
FIG. 3 shows a partially-enlarged and exploded perspective view of the curtain-type airbag apparatus.

As shown in FIG. 3, the bracket 23 is provided with: a center plate 32 formed in a rectangular shape extending along the vehicle length direction, and having a pair of attaching holes 30 arranged at the center thereof so as to be spaced with each other along the vehicle length direction, and a pair of attaching holes 31 arranged on the both sides along the vehicle length of the attaching holes 30; a pair of attaching plates 35 formed on the both sides along the vehicle length of the center plate 32 so as to be slightly offset toward the vehicle interior side than the center plate 32, and each having an engaging hole 34; a pair of fixing plates 38 formed on the both sides along the vehicle length of the attaching plates 35 so as to be slightly offset toward the vehicle exterior side than the attaching plates 35, and each having an insertion hole 37; and a pair of supporting plates 41 formed on the both sides along the vehicle length of the fixing plates 38 so as to be offset toward the vehicle interior side than the fixing plates 38, and each having an attaching hole 40.

Figure 4:
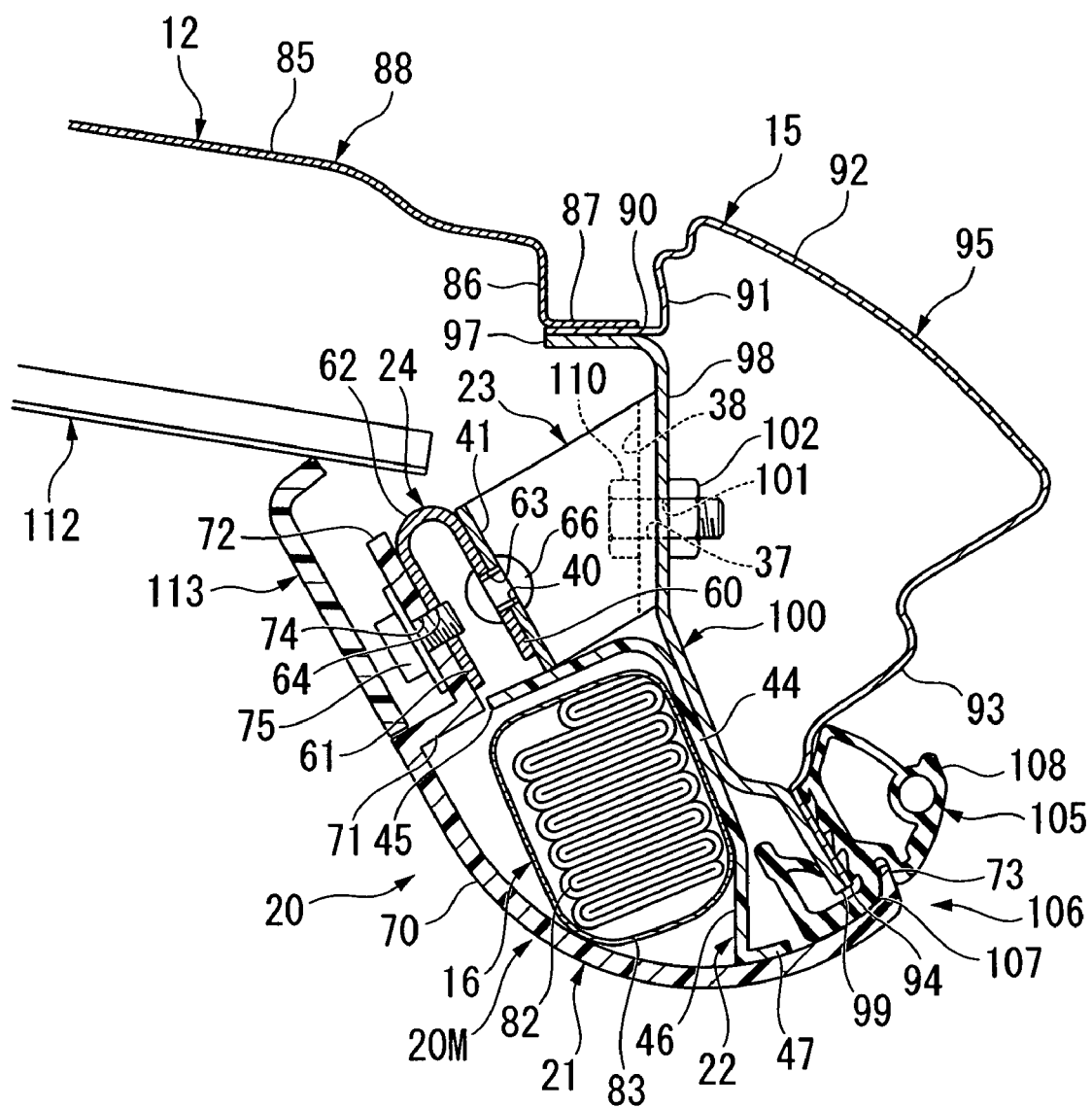
FIG. 4 shows a cross-sectional view of the curtain-type airbag apparatus.

As shown in FIG. 4, the outer cover 22 is provided with: a main plate 44 provided on the roof side rail 15 side of the airbag 16, covering the roof side rail 15 side of the airbag 16, and having a length along the vehicle length; a top plate 45 extending vertically from a top edge of the main plate 44 toward the vehicle interior side; an inclining plate 46 extending from a lower edge of the main plate 44 so as to be inclined with respect to the main plate 44; and an abutting plate 47 slightly extending toward the vehicle exterior side from a lower edge of the inclining plate 46. As shown in FIG. 3, the top plate 45 includes a plurality pairs of: a pair of attaching portion 49 each extending upward and having an attaching hole 48 formed therein; and an insertion hole 50 formed between the pair of attaching portions 49, and having a length in the vehicle length. As shown in FIG. 2, these pairs are formed so as to provide predetermined spaces therebetween. The bracket 23 is attached to the vehicle exterior side of the outer cover 22 at each pair of the attaching portions 49. That is, as shown in FIG. 3, the bracket 23 is fixed to the outer cover 22 by: abutting the corresponding pair of attaching portions 49 to the vehicle interior side of the center plate 32 of the bracket 23; caulking one of rivets 51 inserted in the attaching hole 31 of the center plate 32 and the attaching hole 48 of the attaching portion 49; and caulking another rivet 51 inserted in the another attaching hole 31 of the center plate 32 and the another attaching hole 48 of the attaching portion 49. This attaching procedure is repeated for each of the plurality of brackets 23 respectively.

Figure 5:
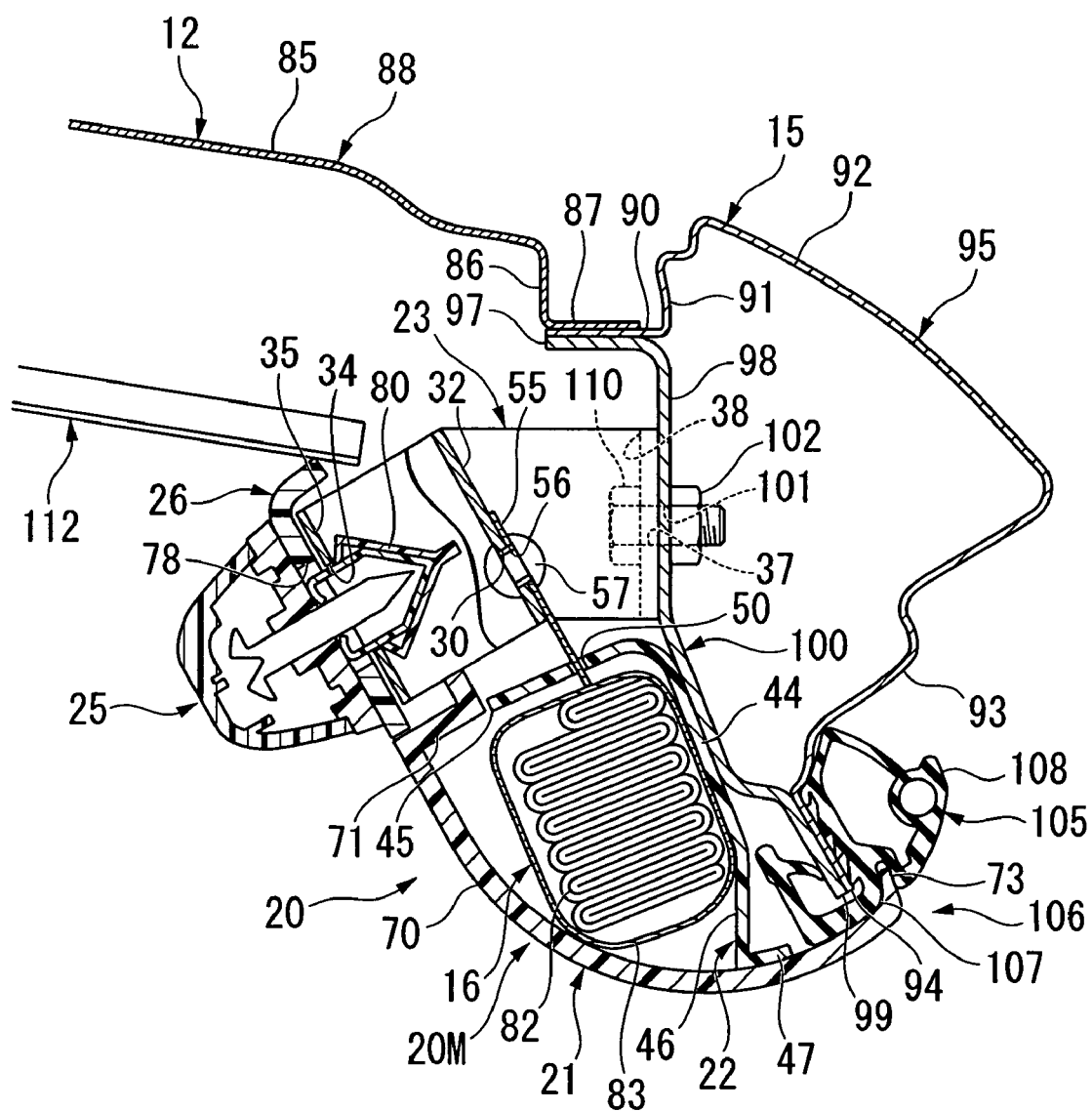
FIG. 5 shows a cross-sectional view of the curtain-type airbag apparatus.

As shown in FIG. 2, a plurality of attaching pieces 55 are formed on the top end of the airbag 16 so as to provide predetermined spaces therebetween along the length thereof; and a pair of attaching holes 56 are formed in each attaching piece 55 respectively. Each attaching pieces 55 of the airbag 16 is inserted into the corresponding insertion hole 50 of the outer cover 22 from the lower side thereof, and thereby abutting each attaching pieces 55 to the vehicle interior side of the center plate 32 of the brackets 23. In this state, the airbag 16 is fixed to the brackets 23 by: caulking the rivet 57 inserted in one of the attaching holes 30 of the center plate 32 and one of the attaching holes 56 of the attaching piece 55; and caulking another rivet 57 inserted in another attaching hole 30 of the center plate 32, and another attaching holes 56 of the attaching piece 55, as shown in FIG. 5. This attaching procedure is repeated for each of the plurality of brackets 23 respectively.

As shown in FIG. 4, the hinge member 24 is formed in a reversed (inverted) U-shape by bending a center portion in the length of a rectangular plate member, into a semi-circular tube shape. The reversed U-shape includes a pair of an outer plate 60 and an inner plate 61 which are parallel with each other, and a curved plate 62 connecting between top edges of the outer plate 60 and the inner plate 61. An insertion hole 63 is formed in the outer plate 60, while a threaded screw hole 64 is formed in the inner plate 61. Each of the hinge members 24 is fixed to the vehicle interior side of one of the corresponding supporting plates 41 of the bracket 23. That is, while abutting the outer plate 60 of the hinge member 24 to one of the supporting plates 41 of the bracket 23 as shown in FIG. 3, the rivet 66 inserted in the attaching holes 40 of the supporting plates 41 and the insertion hole 63 of the outer plate 60, is caulked as shown in FIG. 4, and thereby fixing each of the hinge members 24 to one of the supporting plates 41. In addition, while abutting the outer plate 60 of another hinge member 24 to another one of the supporting plates 41 of the bracket 23 as shown in FIG. 3, the rivets 66 inserted in the attaching holes 40 of the supporting plates 41 and the insertion hole 63 Of the outer plate 60, are caulked as shown in FIG. 4, and thereby fixing the hinge members 24 to the other supporting plate 41. This kind of attaching procedure is repeated for each of the brackets 23 respectively.

An inner cover 21 includes: a main plate 70 which has a lower portion curving toward the vehicle exterior side to form a vehicle interior side design face; a stepped plate 71 protruding toward the vehicle exterior side from a top edge of the main plate 70; an attaching plate 72 protruding upward from an end on the vehicle exterior side of the stepped plate 71; and an engaging plate 73 slightly protruding upward from an edge on the vehicle exterior side of the main plate 70. The plural attaching plates 72 are formed so as to form predetermined spaces therebetween along the length thereof, and an attaching hole 74 is formed in the attaching plates 72 respectively. The inner cover 21 is fixed from the vehicle interior side to each of the hinge members 24 fixed to the plural brackets 23. That is, as shown in FIG. 4, the attaching plate 72 is fixed to the hinge members 24 by: abutting the attaching plate 72 of the inner cover 21 from the vehicle interior side to the inner plate 61 of the hinge members 24; and screwing the bolts 75 inserted in the attaching hole 74 of the attaching plate 72, to the screw hole 64 formed in the inner plate 61 of the hinge members 24. This kind of attaching procedure is repeated for each attaching plates 72. In this situation, the top plate 45 of the outer cover 22 neighbors on a bottom position of the attaching plate 72 of the inner cover 21, while the abutting plate 47 of the outer cover 22 neighbors on a lower portion of the main plate 70 of the inner cover 21. As a result, the inner cover 21 and the outer cover 22 form a tubular shape (i.e., a casing shape), and accommodate the airbag 16 therein.

As shown in FIG. 3, a pair of insertion holes 78 is formed in the cover bases 26, for the grab handle 25, so as to be separated from each other along the vehicle length.

In addition, the grab handle 25 includes a grip 79 to be gripped by an occupant, and a pair of attaching clips 80 arranged on the both sides of the grip 79.

Then, while abutting the cover bases 26 to the pair of attaching plates 35 so as to cover the center plate 32 and the rivets 51 and 57 of the bracket 23 from the vehicle interior side: one of the attaching clips 80 of the grab handle 25 is inserted into one of the insertion holes 78 of the cover base 26, and is thereafter engaged with the engaging hole 34 of the attaching plate 35 of the bracket 23; and another attaching clip 80 is also inserted into another insertion hole 78, and is thereafter engaged with the engaging hole 34 of the attaching plate 35 of the bracket 23. With this assembling procedure, the grab handle 25 and the cover base 26 are fixed to the bracket 23 as shown in FIG. 5.

During the above-mentioned assembling procedures, each attaching pieces 55 of the airbags 16 having the inflator 17 is inserted from the lower side into the corresponding insertion hole 50 of the outer cover 22; and the bracket 23 is attached to the attaching piece 55 of the airbag 16 and the attaching portion 49 of the outer cover 22 using the rivets 57 and the rivets 51.

Next, the grab handle 25 is attached to the bracket 23 so as to sandwich the cover bases 26 therebetween, by inserting the attaching clips 80 into the insertion holes 78 of the cover base 26 and by thereafter engaging the attaching clips 80 with the engaging holes 34. Next, the inner cover 21 is attached via the plural hinge members 24 to the bracket 23 using the plural rivets 66 and the plural bolts 75.

By performing the above-mentioned assembling, the plural brackets 23, the outer cover 22, the airbag 16, the inflator 17, the plural hinge members 24, the inner cover 21, the plural cover bases 26, the plural grab handles 25, the plural rivets 51, the plural rivets 57, the plural rivets 66, and the plural bolts 75, are modularized to form an airbag module 20M. The airbag module 20M is attached to the vehicle body as shown in FIGS. 4 and 5. Moreover, the airbag 16 is provided with: an airbag main body 82 which develops in a curtain-shape manner along the inside of the window 14; and a cover 83 which covers the folded airbag main body 82.

At the side of the roof 12 of the vehicle 10, it is provided with: a main upper plate 85 arranged substantially in a horizontal manner; a downwardly-extending plate 86 which extends downward from a side end on the outside in the vehicle width of the main upper plate 85; a metal roof panel 88 having a connection plate 87 which extends outward in the vehicle width so as to be substantially parallel with the main upper plate 85; an inner connection plate 90 joined with the lower side of the connection plate 87 of the roof panel 88; an upwardly-extending plate 91 which extends upward from the side end on the outside in the vehicle width of the inner connection plate 90; an outer plate 92 which obliquely extends downward and outward in the vehicle width from the upper end of the upwardly-extending plate 91; an inwardly-extending plate 93 which obliquely extends downward and inward in the vehicle width from the lower end of the outer plate 92; a metal outer panel 95 having an outer connecting plate 94 which obliquely extends downward and outward in the vehicle width from the lower end of the inwardly-extending plate 93; an upper connecting plate 97 joined with the lower side of the inner connection plate 90 of the outer panel 95; a middle attaching plate 98 which extends downward from the side end on the outside in the vehicle width of the upper connecting plate 97; and a metal roof side rail inner 100 having a lower connecting plate 99 which obliquely extends downward and outward in the vehicle width from the lower end of the middle attaching plate 98, and is joined with the inside in the vehicle width of the outer connecting plate 94 of the outer panel. The outer panel 95 and the roof side rail inner 100 form a roof side rail 15 having a closed cross-sectional construction which extends in the vehicle length.

Plural insertion holes 101 are formed in the middle attaching plate 98 of the roof side rail inner 100 so as to have predetermined distances therebetween along the vehicle length; and weld nuts 102 are fixed on the vehicle exterior side of the insertion holes 101 of the middle attaching plate 98.

In addition, a sealing member 105 mainly made of rubber is attached to a connection between the outer connecting plate 94 of the outer panel 95 and the lower connecting plate 99 of the roof side rail inner 100, so as to sandwich the connection, the connection forming a lower end of the roof side rail 15. The sealing member 105 seals a gap between a door opening 106 on the lower side of the roof side rail 15 and the side door 13 shown in FIG. 1, and is provided with a sandwiching portion 107 which sandwiches the lower edge of the roof side rail 15 and a hollow sealing portion 108 which abuts the side door 13 while closing the side door 13.

The airbag module 20M of the curtain-type airbag apparatus 20 modularized in advance as explained in the above, is fixed to the middle attaching plate 98 of the roof side rail inner 100 by: engaging the engaging plate 73 of the inner cover 21 with a gap between the sandwiching portion 107 and the sealing portion 108 of the sealing member 105, from the lower side thereof; thereafter abutting the brackets 23 from the vehicle interior side to the middle attaching plate 98 of the roof side rail inner 100; inserting the bolt 110 inserted in the insertion holes 37 from the vehicle interior side of the fixing plates 38 of one of the brackets 23 as shown in FIG. 3, into the insertion hole 101 of the middle attaching plate 98 as shown in FIG. 4, and thereafter screwing the bolt 110 into the weld nut 102; inserting the another bolt 110 inserted in the insertion holes 37 from the vehicle interior side of the another fixing plates 38 of the bracket 23, into the another insertion hole 101 of the middle attaching plate 98, and thereafter screwing the bolt 110 into the another weld nut 102; and fixing the bolts 110 to fix the bracket 23 to the middle attaching plate 98 of the roof side rail inner 100. As a result of this kind of fixing procedure to the brackets 23, the airbag module 20M is fixed to the middle attaching plate 98 of the roof side rail inner 100. Moreover, the bolts 110 are inserted into the insertion holes 37 of the brackets 23 through a notched portion between the attaching plates 72.

As a result of the above procedures, the airbag 16 is arranged along the roof side rail 15 being a top edge of the window 14, and the vehicle interior side thereof is covered with the inner cover 21. In addition, the inner cover 21 is supported by the vehicle body 11 via the plurality of reversed U-shaped metal hinge members 24 arranged partially along the length of the airbag 16. In addition, the inner cover 21 is attached to the roof side rail inner 100 on the vehicle body 11 side via common brackets 23, together with the cover bases 26 and the grab handles 25 being other interior members. In addition, the outer cover 22 which covers the vehicle exterior side of the airbag 16 is also attached to the vehicle body 11 side via the brackets 23. Moreover, it is not always necessary to provide the outer cover 22, and it may be arranged such that the airbag 16 be arranged in a space formed between the inner cover 21 and the roof side rail inner 100.

After fixing the airbag module 20M to the roof side rail inner 100 as explained in the above, a plurality of synthetic resin-made decorated caps 113 are fixed for covering the brackets 23 and the like, to locations: between the stepped plate 71 of the inner cover 21 and the roof lining 112, in the vertical direction; and gaps between the cover bases 26 neighboring with each other, and in front and behind of the cover bases 26, in the vehicle length. With this, these caps 113, the cover bases 26 and the inner cover 21 form a single continuous face, and thereby forming a design face on the vehicle interior side together with the inner cover 21. The curtain-type airbag apparatus 20 is constructed by the airbag module 20M and the plural caps 113.

According to the curtain-type airbag apparatus 20 of the present embodiment, when a vehicle collision is occurred and if inflating conditions such as detection of the acceleration of gravity exceeding the predetermined value are satisfied, then the inflator 17 is ignited and the airbag main body 82 of the folded airbag 16 is developed while breaking the cover 83 so as to extend downward by gas generated by the inflator 17. Then, the developing airbag main body 82 collides with a lower portion of the main plate 70 of the inner cover 21, and thereby applying pushing force to the lower portion toward the vehicle interior side. With this pushing force, the inner cover 21 rotates such that a lower portion thereof moves toward the vehicle interior side, while deforming the reversed U-shaped hinge members 24 attached to the top end of the inner cover 21 so as to expand the curved plate 62 and thereby departing the inner plate 61 from the outer plate 60. With this, the inner cover 21 is opened so as to separate a lower portion thereof from a lower portion of the outer cover 22, while releasing the engaging plate 73 from the sealing member 105. As a result, the airbag main body 82 develops downward along the inner surface of the window 14 from the formed gap.

According to the curtain-type airbag apparatus 20 of the present embodiment, when the airbag 16 develops and if the pressing force is applied to the inner cover 21, the reversed U-shaped hinge members 24 which attach the inner cover 21 to the vehicle body 11 are deformed, and thereby rotating the inner cover 21. Therefore, since the hinge members 24 which are independent from the inner cover 21 are attached for deforming them to rotate the inner cover 21, the flexibility in arranging the hinge members 24 can be improved. Accordingly, even in the case in which the airbag 16 is arranged along the round-shaped roof side rail 15, the inner cover 21 can be smoothly pressed and opened. Furthermore, it is also possible to secure a wide opening for rotating the inner cover 21.

In addition, since the hinge members 24 are made of metal, they are hardly influenced from temperature comparing to employing resin, and thereby enabling obtaining reliable opening.

In addition, since the hinge members 24 are partially provided along the length of the airbag 16, even in the case in which the airbag 16 is arranged along the round-shaped roof side rail 15, the inner cover 21 can be smoothly pressed and opened by the airbag 16 which develops more easily.

In addition, the number of parts and the number of assembling procedures can be reduced because: the inner cover 21 is attached via the common brackets 23 to the vehicle body 11 side together with the cover bases 26 and the grab handles 25 which are other interior members; and the outer cover 22 covering the vehicle exterior side of the airbag 16 is also attached via the brackets 23 to the vehicle body 11 side. Furthermore, since the inner cover 21, the airbag 16, the outer cover 22, the cover bases 26, the grab handles 25 can be assembled to modularized in advance, the installation procedures thereafter can be made easily.

In addition, by uniting the inner cover 21 covering the vehicle interior side of the airbag 16 and the outer cover 22 covering the vehicle exterior side of the airbag 16, the rigidity of the airbag module 20M for maintaining the shape thereof can be increased. Furthermore, only by replacing the inner cover 21, the airbag module 20M having a color matched with the interior color can be obtained easily, while employing the common outer cover 22 and the airbag 16.

In addition, since the hinge members 24 are provided between the brackets 23 and the inner cover 21, while developing the airbag 16, the hinge members 24 enables the inner cover 21 swing in relation to the brackets 23, and thereby preventing large force applied to the outer cover 21. Accordingly, the motion thereof while developing the airbag 16 can be further stable.

In addition, since it is employed with the hinge members 24 being U-shaped elements having one end attached to the inner cover 21 and another end attached to the brackets 23, the characteristics thereof as hinge elements can be adjusted by adjusting the hinge members 24. Accordingly, the performance of the inner cover 21 while developing the airbag 16 can be changed easily.

In addition, by attaching in advance the grab handles 25 being another members which have no relation to the curtain-type airbag apparatus 20 to the brackets 23, and by modularizing them into the airbag module 20M, it is possible to cancel a process for attaching only the grab handles 25 to the vehicle body 11. Accordingly, the assembly can be made easily.

In addition, another interior member is the grab handles 25 that should be firmly attached to the vehicle body 11, and the grab handles 25 can be modularized by attaching it in advance to the brackets 23; therefore, it is possible to suppress occurring of installation errors or the like by confirming the assembling condition of the grab handles 25 before attaching them to the vehicle body 11.

In addition, the brackets 23 of the airbag module 20M are covered with the cap 113 in a state in which the airbag module 20M is attached to the vehicle body 11; therefore, the continuous design line of the inner cover 21 can be formed by fixing the brackets 23 to the vehicle body 11 by the bolts (fixing member) 110, and covering the brackets 23 thereafter.

Second Embodiment

Figure 6:
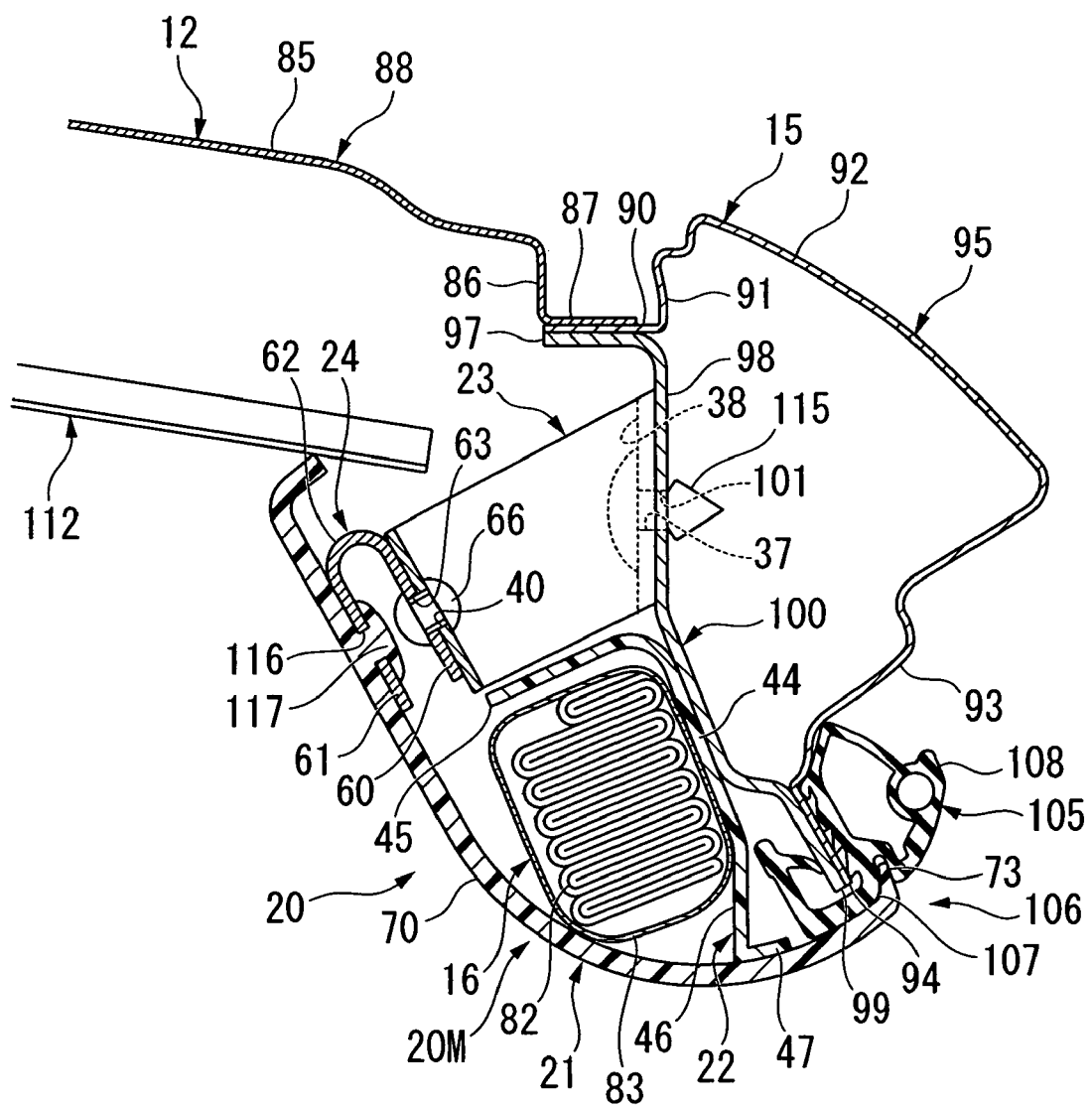
FIG. 6 shows a cross-sectional view of a curtain-type airbag apparatus according to a second embodiment of the present invention.

A curtain-type airbag apparatus according to a second embodiment of the present invention will be explained below with mainly reference to FIG. 6, with the focus on the differences with the first embodiment mentioned above. In parts that are the same as those in the first embodiment, the same reference symbols are applied and their explanations are omitted here.

In the curtain-type airbag apparatus 20 of the present embodiment, the cap 113 is omitted that needs to be provided as an independent member in a bolt-fixing construction of the first embodiment, in order to insert an attaching tool.

Therefore, the hinge members 24 are welded to the inner cover 21, and the brackets 23 are attached to the roof side rail inner 100 with synthetic resin-made clips 115. That is, the upper side of the rounded main plate 70 of the inner cover 21 is extended so as to form a flat plate; and ribs 117 are formed on the flat plate, that are to be inserted into the attaching holes 116 and thereafter be welded, the attaching holes 116 being formed in place of screw holes of the inner plate 61 of the hinge members 24. In addition, the synthetic resin-made clips 115 are attached to the fixing plate 38 of the bracket 23 by inserting them into the insertion holes 37 (therefore, the weld nuts are not provided to the brackets 23) in order to enable attaching of the synthetic resin-made clips 115 to the insertion holes 101 of the middle attaching plate 98 of the roof side rail inner 100 without using tools.

Then, the curtain-type airbag apparatus 20 is modularized in advance by: attaching the outer plate 60 of the hinge members 24 to the brackets 23 by rivets 66; attaching the inner cover 21 to the inner plate 61 of the hinge members 24 by welding the ribs 117; and attaching the clips 115 to the brackets 23. Moreover, during this modularization procedures, the outer cover 22, the airbag 16, the inflator 17, the cover bases 26, and the grab handles 25 are attached to the brackets 23 as same as in the first embodiment.

As explained in the above, the brackets 23, the outer cover 23, the airbag 16, inflator 17, the hinge members 24, the inner cover 21, the cover bases 26, the grab handles 25, the clips 115, the rivets 51, the rivets 57, and the rivets 66, are assembled and modularized in advance to form the curtain-type airbag apparatus 20. The modularized curtain-type airbag apparatus 20 is attached to the vehicle body 11 by engaging the clips 115 with the insertion holes 101 of the middle attaching plate 98 of the roof side rail inner 100.

Also in the curtain-type airbag apparatus 20 of the present embodiment, the developing airbag main body 82 collides with the lower portion of the main plate 70 of the inner cover 21, and pushes it toward the vehicle interior side. With this pushing force, the inner cover 21 rotates such that the lower portion thereof moves toward the vehicle interior side, while deforming the reversed U-shaped hinge members 24 attached to the top end of the inner cover 21, such that the curved plate 62 thereof is expanded to depart the inner plate 61 from the outer plate 60. Furthermore, the inner cover 21 opens such that the lower portion thereof depart from the lower portion of the outer cover 22, and the airbag main body 82 develops downward along the inside of the window 14 from a gap formed between the lower portions.

According to the present embodiment, the same advantageous effects can be obtained as those of the first embodiment; and furthermore, since the cap can be omitted, it is possible to improve the appearance and to reduce the number of parts.

Third Embodiment

Figure 7:
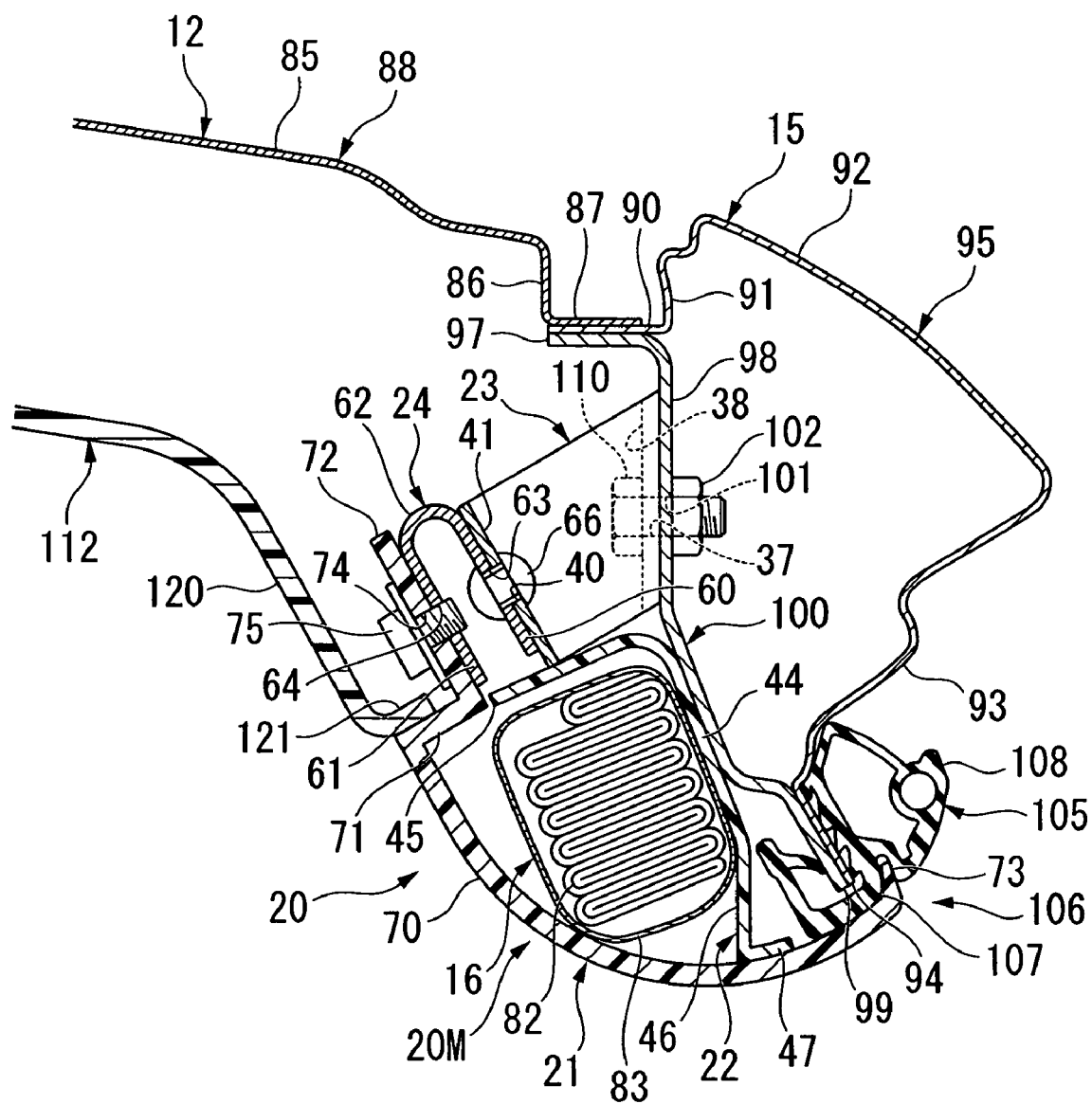
FIG. 7 shows a cross-sectional view of a curtain-type airbag apparatus according to a third embodiment of the present invention.

A curtain-type airbag apparatus according to a third embodiment of the present invention will be explained below with mainly reference to FIG. 7, with the focus on the differences with the first embodiment mentioned above. In parts that are the same as those in the first embodiment, the same reference symbols are applied and their explanations are omitted here.

Also in the present embodiment, the cap 113 is omitted that needs to be provided as an independent member in a bolt fixing construction of the first embodiment, in order to insert an attaching tool. And instead of providing the cap 113, the roof lining 112 is extended in the present embodiment.

That is, in the present embodiment, the curtain-type airbag apparatus 20 which is modularized as same as in the first embodiment is installed into the roof side rail inner 100. This installation is performed before installing the roof lining 112, and thereafter, the roof lining 112 is installed in the vehicle body 11. The roof lining 112 has inclining plate portions 120 that extend downwardly and obliquely from both side edges thereof in the vehicle length, and engaging plate portions 121 that obliquely protruding toward the vehicle exterior side from the edges of the inclining plate portions 120. The roof lining 112 covers the brackets 23 and the like from the vehicle interior side by engaging the engaging plate portions 121 with the stepped plate 71 of the inner cover 21.

Also in the curtain-type airbag apparatus 20 of the present embodiment, the developing airbag main body 82 collides with the lower portion of the main plate 70 of the inner cover 21, and pushes it toward the vehicle interior side. With this pushing force, the inner cover 21 rotates such that the lower portion thereof moves toward the vehicle interior side, while deforming the reversed U-shaped hinge members 24 attached to the top end of the inner cover 21, such that the curved plate 62 thereof is expanded to depart the inner plate 61 from the outer plate 60. Furthermore, the inner cover 21 opens such that the lower portion thereof depart from the lower portion of the outer cover 22, and the airbag main body 82 develops downward along the inside of the window 14 from a gap formed between the lower portions.

According to the present embodiment, the same advantageous effects can be obtained as those of the first embodiment; and furthermore, since the brackets 23 are covered with the roof lining 112, it is possible to match the design line of the roof lining 112 with the design line of the inner cover 20 to arrange them continuously. Accordingly, it is possible to improve the appearance and to reduce the number of parts. Furthermore, since it does not need additional independent covering member, installation thereof can be made easily.

Fourth Embodiment

Figure 8:
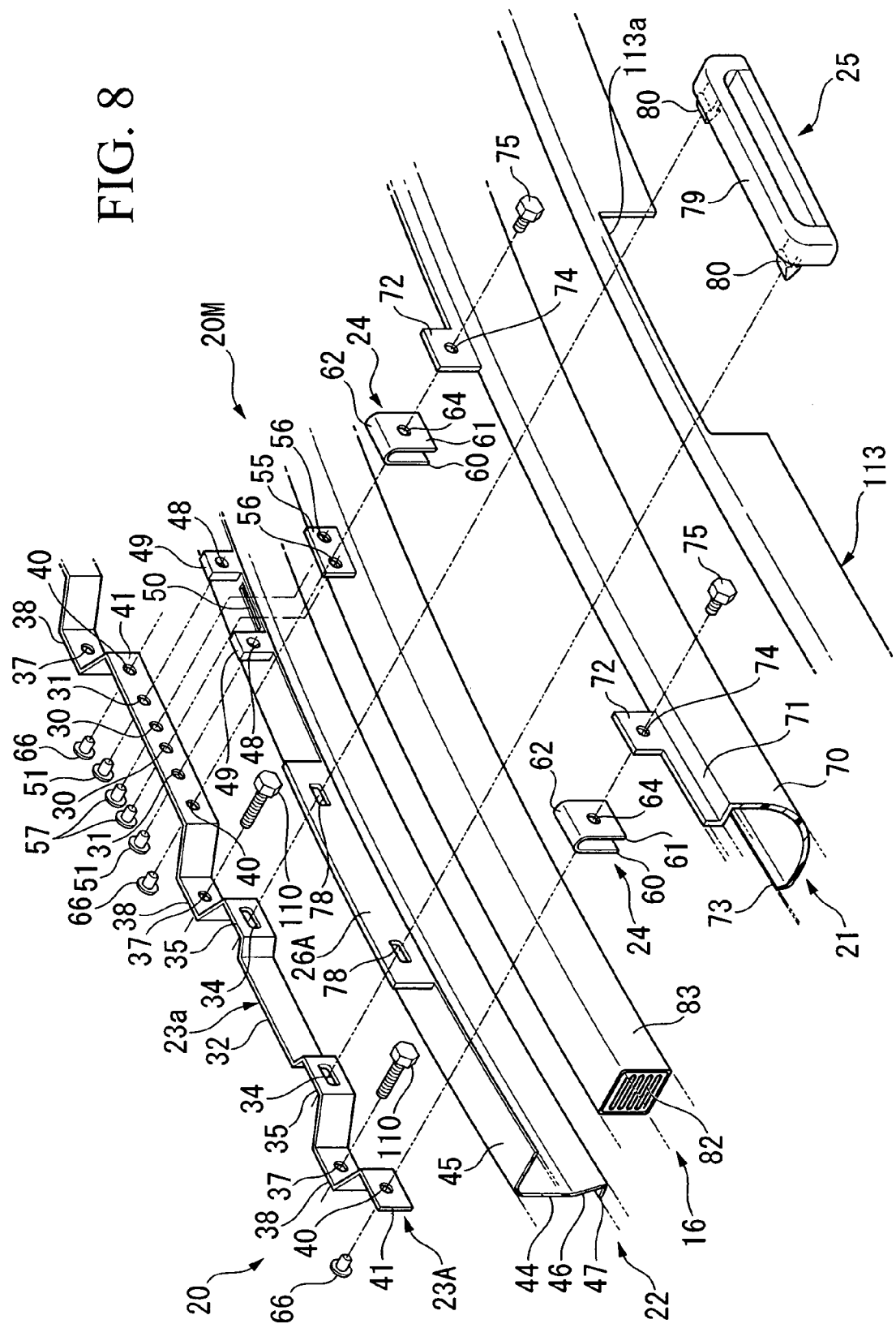
FIG. 8 shows a partially-enlarged and exploded perspective view of a curtain-type airbag apparatus according to a fourth embodiment of the present invention.
Figure 9:
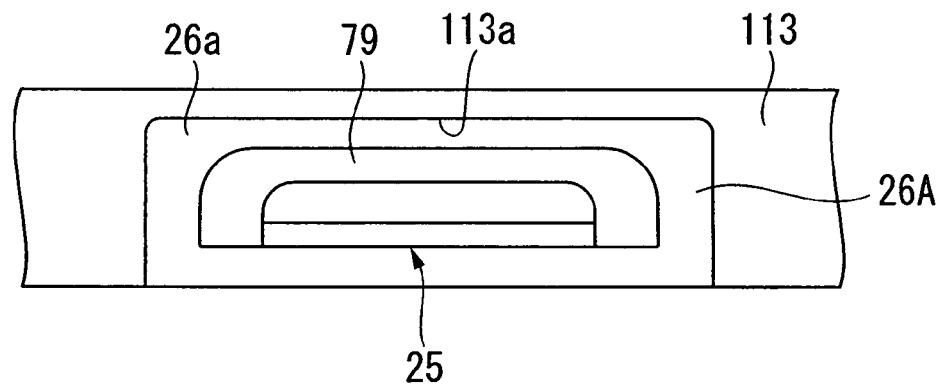
FIG. 9 shows a partially enlarged side view of the curtain-type airbag apparatus.

A curtain-type airbag apparatus according to a fourth embodiment of the present invention will be explained below with mainly reference to FIGS. 8 and 9, with the focus on the differences with the first embodiment mentioned above. In parts that are the same as those in the first embodiment, the same reference symbols are applied thereto and their explanations are omitted here.

In the present embodiment, in place of the independent cover bases 26 of the first embodiment, a cover base 26A having insertion holes 78 is unitarily formed on the top plate 45 of the outer cover 22 at the opposite edge with respect to the edge provided with the main plate 44. Moreover, this kind of the cover base 26A is formed at plural locations along the length of the outer cover 22 (not illustrated). Furthermore, one set of a pair attaching portions 49 and the insertion hole 50 is arranged between the adjacent cover bases 26A on the top plate 45. Attaching pieces 55 each having attaching holes 56 are formed on the airbag 16 so as to be matched with the position of the insertion holes 50.

In the present embodiment, the plural brackets 23 of the first embodiment are unitarily formed to be one bracket 23A. This bracket 23A has attaching portions 23a which are formed along the length thereof and are equivalent to the brackets 23 of the first embodiment.

Each attaching portion 23a has: a center plate 32 that forms a rectangular shape extending along the vehicle length, and does not have attaching holes; a pair of attaching plates 35 formed at both ends along the vehicle length of the center plate 32 so as to be somewhat shifted toward the vehicle interior side than the center plate 32, and each having engaging holes 34 formed therein; a pair of insertion fixing plates 38 formed at both ends along the vehicle length of the pair of attaching plates 35 so as to be somewhat shifted toward the vehicle exterior side than the attaching plates 35, and each having insertion holes 37 formed therein; and a supporting plates 41 formed at both ends along the vehicle length of the pair of fixing plates 38 so as to be somewhat shifted toward the vehicle interior side than the fixing plates 38, and each having attaching holes 40 formed therein. In addition, the adjacent attaching portions 23*a* have the supporting plate 41 in common. Furthermore, between the attaching holes 40 of the common supporting plates 41, it is formed with a pair of attaching holes 30, and a pair of attaching holes 31 arranged on the both sides of the attaching holes 30.

In the present embodiment, the airbag 16 and the outer cover 22 are united by: inserting the attaching pieces 55 of the airbag 16 equipped with the inflator 17 into the insertion holes 50 of the outer cover 22 from the lower side; and fixing the attaching piece 55 of the airbag 16 and the attaching portion 49 of the outer cover 22 by the rivets to be inserted into the attaching holes 56 of the attaching piece 55 and the attaching holes 30 of the bracket 23A, and the rivets 51 to be inserted into the attaching holes 48 of the attaching portion 49 and the attaching holes 31 of the bracket 23A.

Next, the outer cover 22 is sandwiched between the grab handle 25 and the bracket 23A by inserting the attaching clips 80 into the insertion holes 78 of the cover base 26A and thereafter engaging the attaching clips 80 with the engaging holes 34 of the bracket 23A.

Next, the inner cover 21 is attached via the plural hinge members 24 to the bracket 23A by rivets 66 to be inserted into the attaching holes 40 of the supporting plates 41 and the insertion hole 63 of the outer plate 60, and bolts 75 to be inserted into the attaching hole 74 of the attaching plate 72 and screwed into screw holes 64 formed in the inner plate 61 of the hinge members 24.

With these assembling procedures, the bracket 23A, the outer cover 22, the airbag 16, the inflator 17, the plural hinge members 24, the inner cover 21, the plural grab handles 25, the plural rivets 51, the plural rivets 57, and the plural rivets 66, and the plural bolts 75, are modularized to form the airbag module 20M.

The airbag module 20M is attached to the roof side rail inner 100 on the vehicle body side by the bolts 110 to be inserted into the insertion holes 37 of the fixing plates 38 of the bracket 23A.

Figure 10:
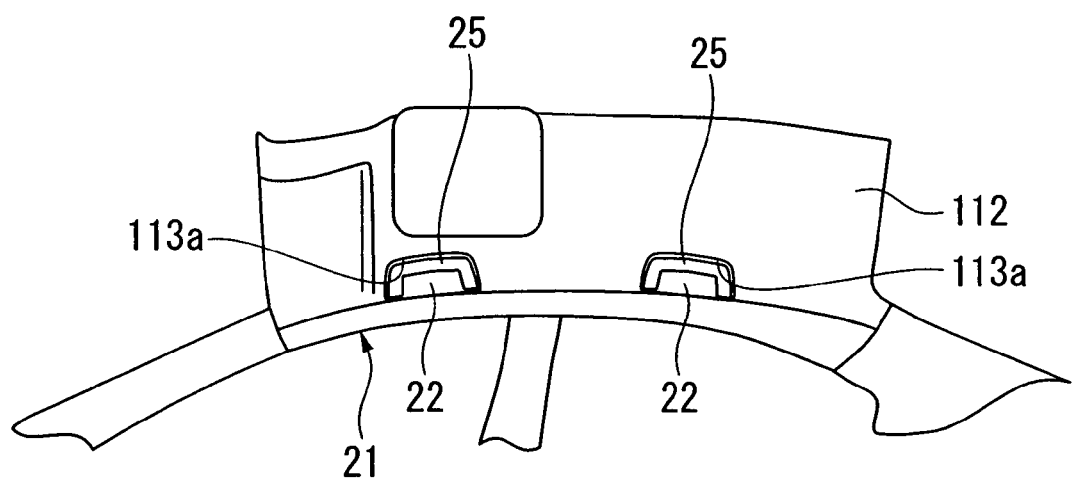
FIG. 10 shows a partially enlarged side view of a variant example of the curtain-type airbag apparatus.
Figure 11:
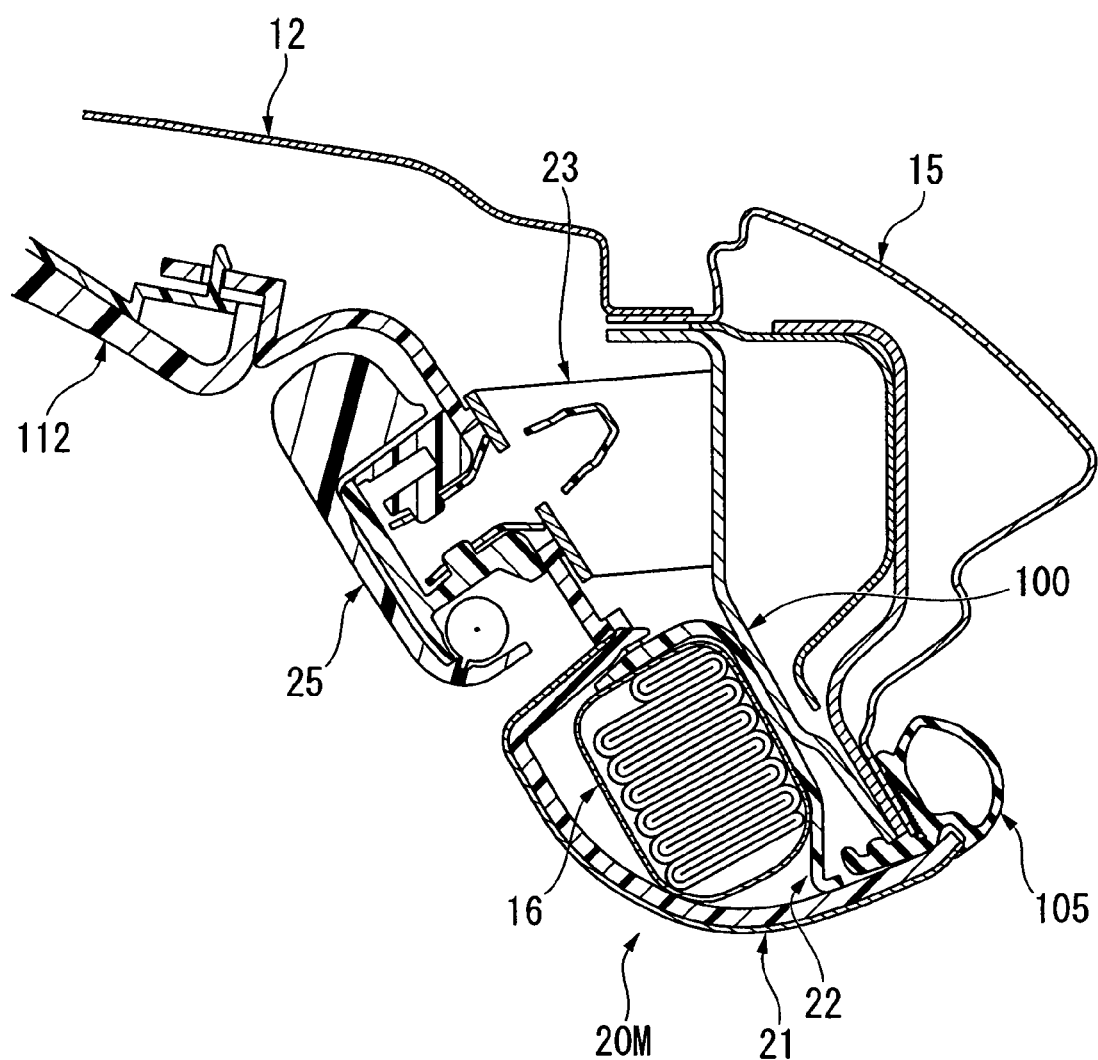
FIG. 11 shows a cross-sectional view of a variant example of the curtain-type airbag apparatus.

After fixing the airbag module 20M to the roof side rail inner 100 as explained in the above, a synthetic resin-made decorated cap 113 is fixed for covering the bracket 23A and the like, to a location between the stepped plate 71 of the inner cover 21 and the roof lining 112, in the vertical direction. Moreover, the cap 113 is formed with a window 113*a* for inserting and exposing the grab handle 25 toward the vehicle interior side. A portion for attaching the grab handle 25 in the bracket 23A, where is on the far side from the window 113*a* is covered with the cover base 26A unitarily formed with the outer cover 22; therefore, as shown in FIG. 9, the bracket 23A will not be exposed from the window 13*a*. The exposed portion 26*a* is formed by a part of the cover base 26A of the outer cover 22 that is exposed from the window 113*a*; and the grab handle 25 is attached to the exposed portion 26*a*. Moreover, as shown in FIGS. 10 and 11, it may be arranged such that the cap 113 is formed by extending the roof lining 112 to cover the attaching portion of the airbag module 20M.

The present embodiment can obtain the same advantageous effects as those of the above-mentioned first embodiment. Furthermore, since the outer cover 22 is unitarily formed with the cover base 26A for covering the bracket 23A, and since the grab handles 25 is made to be exposed from the window 113*a* of the cap 113 toward the vehicle interior side, an independent cover becomes unnecessary, the plural caps 113 can be formed as one unit and thereby enabling reduction in the number of parts.

In addition, since the exposed portion 26*a* that exposes from the window 113*a* is provided to a part of the outer cover 22, it is possible to obtain a design accent such as changing the color of the exposed portion 26*a* so as to differ from that of the cap 113. In addition, since the upper cover does not exist, it is possible to reduce the resistance to the developing airbag 16. In addition, since the rotational axis during the development is arranged at upper side, the inner cover 21 can open easily, and thereby enabling reliable opening performance.

Furthermore, since attaching the grab handle 25 to the exposed portion 26*a* of the outer cover 22 enables arrangements of the around of the grab handle 25 with the design line of the outer cover 22, the degree of freedom in design can be increased.

In addition, the grab handle 25 being another interior member can be assembled after the installation of the airbag module 20M; therefore, the degree of freedom in the assembly can be increased.

Figure 12:
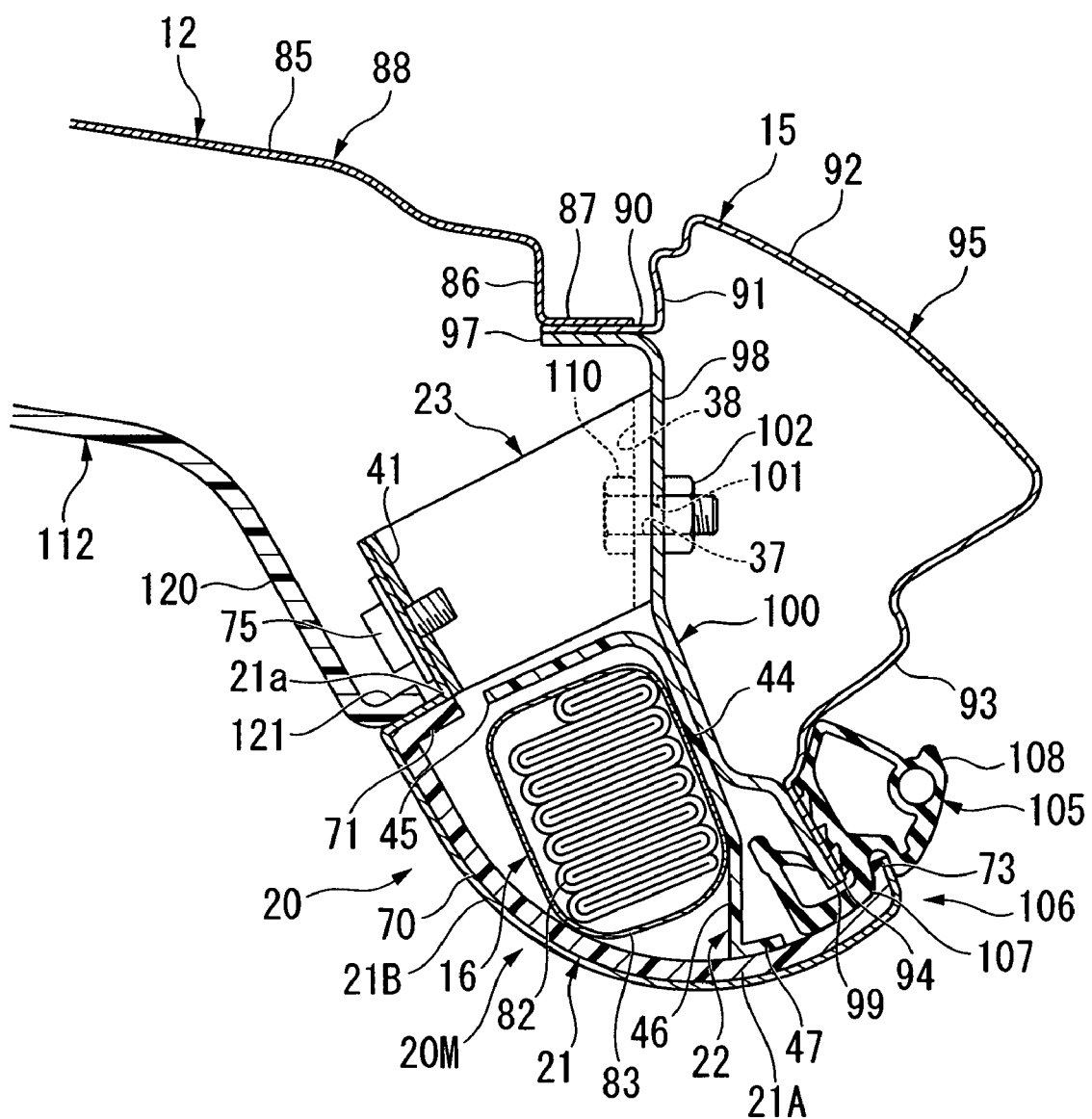
FIG. 12 shows a cross-sectional view of a variant example of the curtain-type airbag apparatus according to each embodiment of the present invention.

In the above-mentioned first to fourth embodiments, the inner cover 21 is constructed so as to swing using the metal reversed U-shaped hinge members 24 while developing the airbag 16; however, as shown in FIG. 12, a hinge 21*a* may be formed by extending a part of a deformable skin (cloth member) 21B that is unitarily formed with a resin portion 21A of the inner cover 21. In this case, it is possible to extremely reduce the resistance by the inner cover 21 to the developing airbag 16, and also to prevent dispersion of the inner cover 21 while developing the airbag 16. Furthermore, since the weight of the hinge 21*a* can be reduced, and since independent hinges are unnecessary, the number of parts can be reduced.

Figure 13:
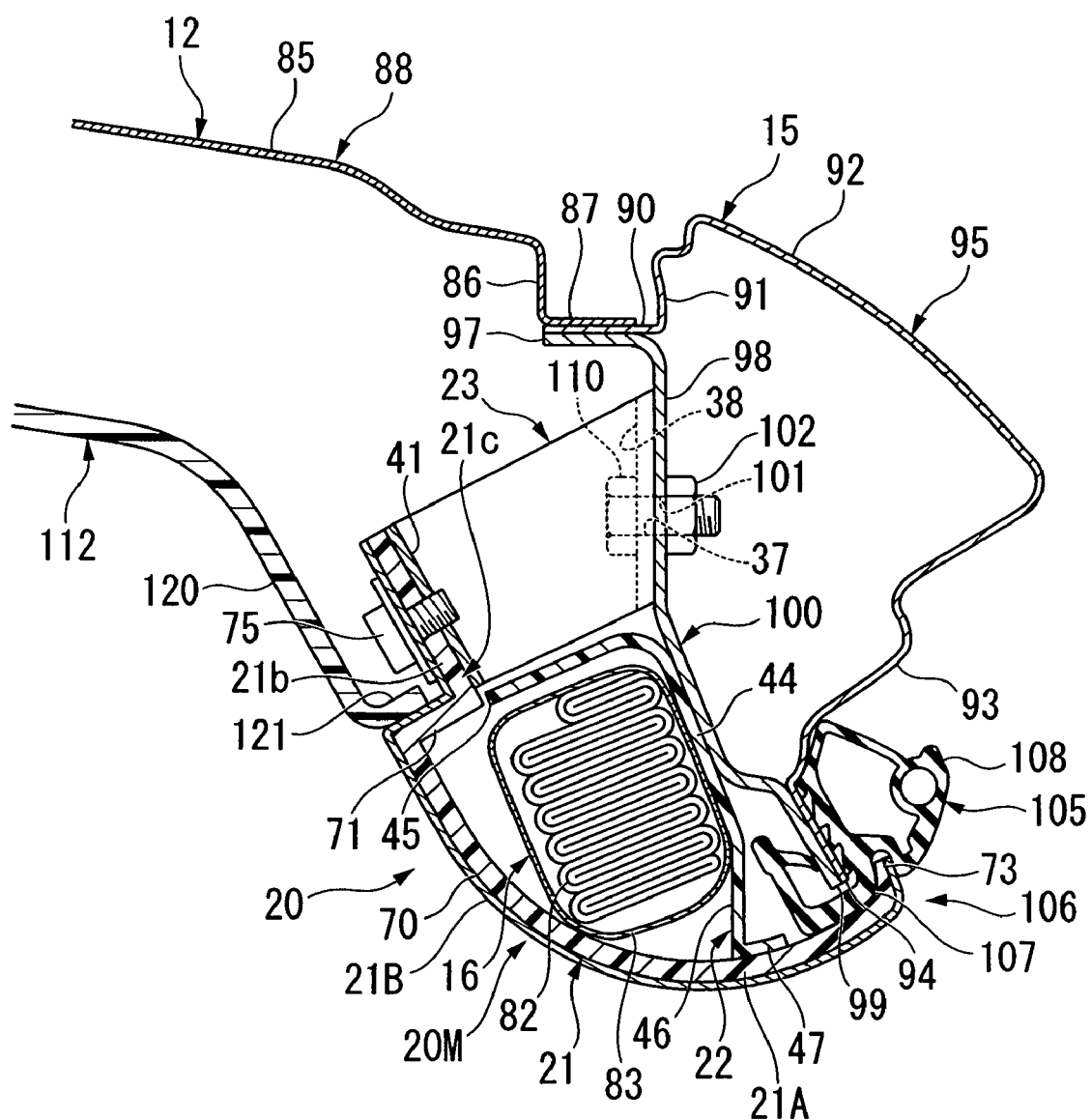
FIG. 13 shows a cross-sectional view of a variant example of the curtain-type airbag apparatus according to each embodiment of the present invention.

In this case, as shown in FIG. 13, in order to connect the bracket 23 and the inner cover 21 without using the hinge 21*a*, the attaching portion 21*b* that hardly deforms may be arranged so as to be parallel with the hinge 21*a* by, for example, extending a resin portion 21A of the inner cover 21. In this case, it is preferable that the plural hinges 21*a* are arranged, and the attaching portions 21*b* are arranged at both sides of the hinges 21*a*. With this construction, it is possible to prevent looseness of the hinge 21 at normal state, by the attaching portions 21*b* that are connected without using the hinges 21*a*. Moreover, a V-notch 21*c* is formed in the attaching portion 21*b* so as to be broken while developing the airbag 16.

Figure 14:
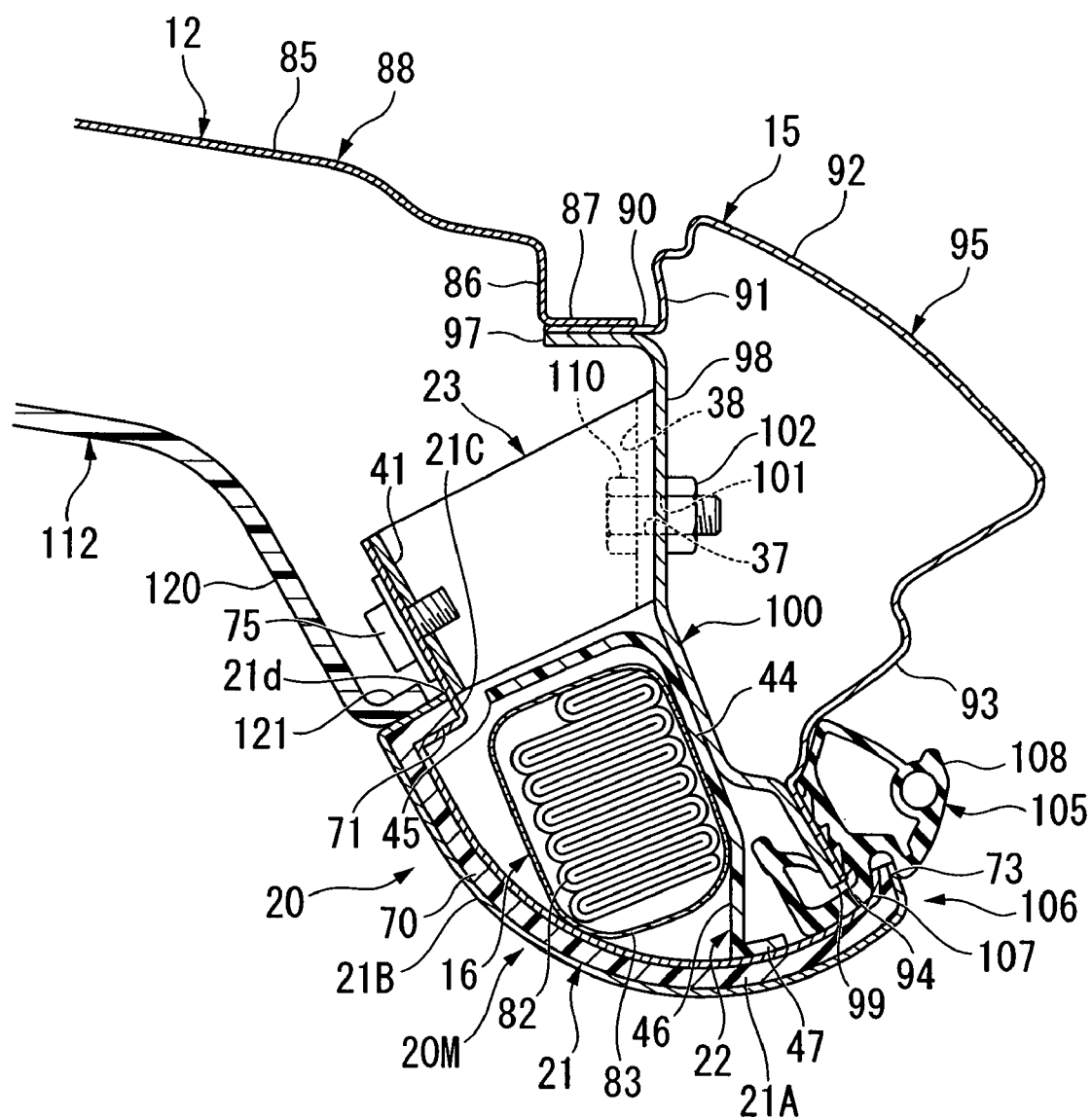
FIG. 14 shows a cross-sectional view of another variant example of the curtain-type airbag apparatus according to each embodiment of the present invention.

Otherwise, as shown in FIG. 14, a hinge 21*d* may be formed by providing a back skin (cloth member) 21C entirely on the backside of the resin portion 21A, and by extending a part of the back skin 21C. This construction also enables extremely reducing the resistance by the inner cover 21 to the developing airbag 16. Furthermore, since there is no influence on the skin 21B to be decorated, it is possible to increase the degree of freedom in design. In addition, since the back skin 21C can absorb shocks by the developing airbag 16, cracking of the resin portion 21A can be prevented. Furthermore, also in the view point that the skin 21B and the back skin 21C can maintain the humidity of the resin portion 21A, it is possible to make the resin portion 21A hardly be cracked. In addition, even in the case in which the resin portion 21A is cracked by the developing airbag 16, the pasted skin 21B and the back skin 21C can prevent dispersion of the cracked resin portion 21A. Moreover, also in this case, by arranging the attaching portion 21*b* formed by extending the resin portion 21A, so as to be parallel with the hinge 21*d*, it is possible to prevent loosing of the hinge 21*d* at the normal condition.

In the above-mentioned first to fourth embodiments, the grab handle 25 is attached as an interior member to the brackets 23; however, members other than the grab handle 25, such as a blowing exit port of an air conditioner or a room light may be attached to the brackets 23.

In addition, in the above-mentioned first to fourth embodiments, the explanations have been made for the curtain-type airbag apparatus 20 arranged at the roof side rail 15 at the upper edge of the window 14; however, the present invention is also applicable to curtain-type airbag apparatuses provided on the top edges of the front and rear windows (for example, a window in the tailgate).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A curtain airbag apparatus comprising:
   an airbag which is arranged along a top edge of a vehicle body and develops in a curtain-shape manner along an inside of a window;
   an inner cover which covers a vehicle interior side of the airbag, the inner cover including a lower portion which is configured and arranged to be pushed aside during deployment of the airbag; wherein the inner cover is operatively supported on the vehicle body via a plurality of spaced-apart hinge members;
   each of the hinge members having a reversed U-shape as viewed in cross section and comprising an inner plate and an outer plate which is substantially parallel to the inner plate, said inner and outer plates interconnected by an integral curved connecting plate, each of the hinge members configured to be bent by movement of the inner cover during deployment of the airbag to move the inner and outer plates to a non-parallel configuration.

2. The curtain airbag apparatus according to claim 1, wherein the hinge member is a metal member.

3. The curtain airbag apparatus according to claim 1, wherein the hinge members are intermittently spaced and provided along a length direction of the airbag.

4. The curtain airbag apparatus according to claim 1, wherein the inner cover is attached to the vehicle body together with another interior member via a common bracket.

5. The curtain airbag apparatus according to claim 1, wherein the inner cover is fixed from the vehicle interior side to each of the hinge members, wherein the hinge members are fixed to a plurality of brackets, and wherein an attaching plate is fixed to the hinge members by abutting the attaching plate of the inner cover to the inner plate of each of said hinge members, passing a bolt through a hole formed in the attaching plate, and screwing the bolt into a threaded hole formed in the inner plate of the hinge member.

6. The curtain airbag apparatus according to claim 1, wherein during deployment of the airbag, the hinge members deform when a pressing force is applied to the inner cover by an inflating air bag, and the deformed hinge members allow the inner cover to rotate.

7. An airbag module for installing an airbag in a folded manner to a vehicle body, the airbag developing in a curtain-shape manner along an inside of a window of a vehicle body, the airbag module comprising:
   a bracket which attaches the airbag module to the vehicle body;
   at least one hinge member attached to the bracket;
   an inner cover which is operatively attached to the bracket by the at least one hinge member and which covers a vehicle interior side of the airbag, the inner cover configured and arranged to be pushed aside during deployment of the airbag; and
   an outer cover which is attached to the bracket and which covers a vehicle exterior side of the airbag;
   wherein said at least one hinge member comprises an inner plate and an outer plate which is substantially parallel to the inner plate, said inner and outer plates interconnected by an integral curved connecting plate, the hinge member configured to be bent by movement of the inner cover during deployment of the airbag to move the inner and outer plates to a non-parallel configuration.

8. The airbag module according to claim 7, wherein the at least one hinge member is provided between the bracket and the inner cover.

9. The airbag module according to claim 8, wherein the hinge member is a substantially U-shaped member in which one end thereof is attached to the inner cover, while another end thereof is attached to the bracket.

10. The airbag module according to claim 7, wherein the airbag module forms a module together with another interior member to be attached to the bracket.

11. The airbag module according to claim 10, wherein the another interior member is a grab handle.

12. A curtain airbag apparatus for a vehicle, the apparatus comprising an airbag configured to inflate and deploy when an inflator is activated, the airbag arranged along a top edge of the vehicle body and configured to expand in a curtain-shape manner along an inside of a window during deployment thereof, the airbag apparatus further comprising:
   an inner cover which covers a vehicle interior side of the airbag, the inner cover configured and arranged to be pushed aside during deployment of the airbag, the inner cover operatively supported on the vehicle via a plurality of spaced-apart hinge members,
   each of the hinge members having an inverted U-shape as viewed in cross section and comprising an inner plate and an outer plate which is substantially parallel to the inner plate, said inner and outer plates interconnected by an integral curved connecting plate, each of the hinge members configured to be bent by movement of the inner cover during deployment of the airbag to move the inner and outer plates to a non-parallel configuration;
   an outer cover which cooperates with the inner cover to substantially surround the airbag in a folded condition thereof;
   wherein the apparatus is configured and arranged such that during deployment thereof, the airbag collides with a main plate of the inner cover to move the main plate toward the vehicle interior side, and to deform the hinge members which are respectively attached to a top end of the inner cover.

13. A curtain airbag apparatus comprising:
   the airbag module according to claim 7; and
   a covering member which covers the bracket when the airbag module is attached to the vehicle body.

* * * * *

UNITED STATES PATENT AND TRADEMARK OFFICE
CERTIFICATE OF CORRECTION

PATENT NO. : 7,735,857 B2
APPLICATION NO. : 11/807419
DATED : June 15, 2010
INVENTOR(S) : Hidaka et al.

It is certified that error appears in the above-identified patent and that said Letters Patent is hereby corrected as shown below:

On the Title page:

In Item (75), "Inventors:", change "Takeru Fukuda, Saitama (JP)" to -- Takeru Fukuda, Utsunomiya (JP) --.

Signed and Sealed this

Nineteenth Day of October, 2010

David J. Kappos
*Director of the United States Patent and Trademark Office*